United States Patent [19]
Onodera et al.

[11] Patent Number: 5,598,899
[45] Date of Patent: Feb. 4, 1997

[54] WIRING STRUCTURE FOR AN ELECTRIC POWER STEERING SYSTEM

[75] Inventors: Tsugio Onodera; Yoshiaki Taniguchi, both of Gunma-ken, Japan

[73] Assignee: Mitsuba Electric Manufacturing Co., Ltd., Gunma-ken, Japan

[21] Appl. No.: 459,238

[22] Filed: Jun. 2, 1995

[30] Foreign Application Priority Data

Jul. 4, 1994 [JP] Japan .................................. 6-176044

[51] Int. Cl.⁶ ...................................................... B62D 5/04
[52] U.S. Cl. ............................................................ 180/433
[58] Field of Search ................................... 180/443, 444, 180/446, 404, 405, 407

[56] References Cited

U.S. PATENT DOCUMENTS 4,960,178  10/1990  Abukawa et al. ...................... 180/443
5,033,565  7/1991  Abukawa et al. ...................... 180/443

*Primary Examiner*—Kevin Hurley
*Attorney, Agent, or Firm*—Skjerven, Morrill, MacPherson, Franklin & Friel

[57] ABSTRACT

The starter motor power cables for the starter motor, having a relatively large cross sectional area and therefore involving a very little voltage drop, are used as a part of the motor drive power cables for the electric power steering system, and the length of the motor drive power cables can be thereby reduced with the net result that the overall voltage drop can be reduced, and a sufficient power output can be produced from the electric power steering system. Also, the reduction in the length of the motor drive power cables reduces the possibility of producing electromagnetic interferences.

4 Claims, 5 Drawing Sheets

WIRING STRUCTURE FOR AN ELECTRIC POWER STEERING SYSTEM

TECHNICAL FIELD

The present invention relates to a wiring structure for an electric power steering system.

BACKGROUND OF THE INVENTION

Electric power steering systems are used in motor vehicles to reduce the effort required to turn the steering wheel as an alternative to more conventional hydraulic power steering systems. In the conventional electric power steering systems, the motor drive power cables extend from the battery to a power unit placed in the passenger compartment, and further extend to the electric actuator for the power steering system. Therefore, the overall length of the motor drive cables is relatively long, and the cables are typically bundled with other electric cables which may include signal lines.

In such a wiring arrangement, the voltage drop due to the electric resistance of the motor drive power cables is a problem particularly because the power steering system consumes a relatively large electric current. Thus, a relatively large electric motor is required to compensate for the voltage drop or the diameter of the motor drive power cables has to be increased to achieve a sufficient power output in the power steering system. In either case, the cost increases. The large current flowing in the motor drive power cables may cause electromagnetic interferences to adjacent signal lines, and it is therefore desirable to minimize the length of the power cables for this reason as well.

BRIEF SUMMARY OF THE INVENTION

In view of such problems of the prior art, a primary object of the present invention is to provide a wiring structure for an electric power steering system which can reduce the voltage drop in the motor drive power cables.

A second object of the present invention is to provide a wiring structure for an electric power steering system which can reduce electromagnetic interferences to other electric circuits.

These and other objects of the present invention can be accomplished by providing a wiring structure for an electric power steering system of a motor vehicle, comprising: a starter motor power cable connected between a battery and a terminal of a starter motor for supplying electric current to the starter motor; and a motor drive power cable connected between the starter motor terminal and an electric power steering system.

Thus, the length of the motor drive power cable leading to the electric power steering system can be substantially reduced as compared to the prior art, and can therefore reduce the voltage drop and electromagnetic interferences to other electric circuits. Because the starter motor power cable is intended for the starter motor, and is accordingly provided with a relatively large cross sectional area, using it as a part of the motor drive power cable for the electric power steering system would not cause any appreciable voltage drop.

The electric power steering system may comprise a power unit and a control unit provided separately from a main body of the electric power steering system. The starter motor terminal preferably comprises a threaded stud, a terminal piece having an annular portion fitted on the threaded stud, and a nut threadably engaged with the stud and securing the terminal piece, the terminal piece including a pair of radial extensions extending from the annular portion, and the starter motor power cable and the motor drive cable being attached to said radial extensions, respectively.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
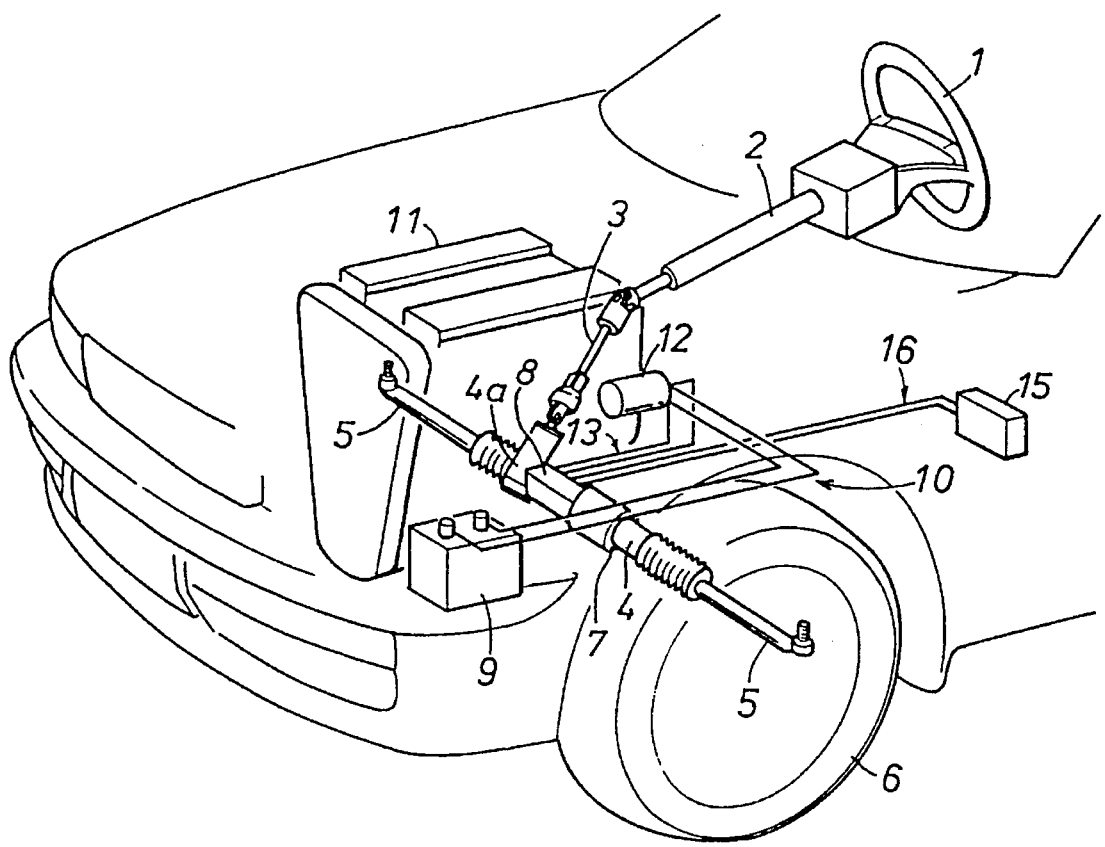
FIG. 1 is a schematic perspective view of a front part of a motor vehicle to which the present invention is applied.
Figure 2:
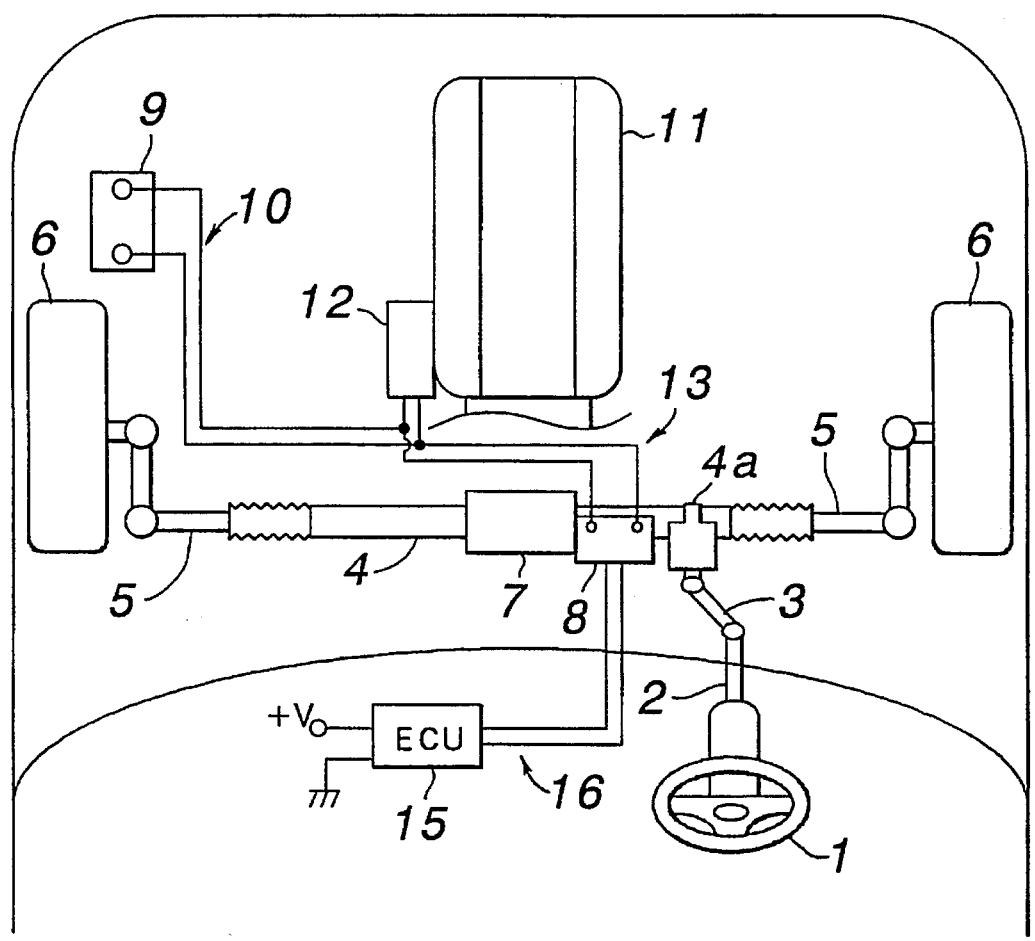
FIG. 2 is a schematic diagram showing a first embodiment of the wiring structure for an electric power steering system according to the present invention.

Referring to FIGS. 1 and 2, a steering wheel 1 is connected to an upper end of a steering shaft 2, and a lower end of the steering shaft 2 is connected, via a connecting rod 3 including a pair of universal joints, to the pinion of a rack and pinion mechanism 4a incorporated in the main body 4 of the electric power steering system. A pair of tie rods 5 are connected to either axial end of the rack of the rack and pinion mechanism adapted to be moved laterally of the vehicle body, and the tie rods 5 are connected to knuckle arms (not shown in the drawings) of front wheels 6 at their other ends. Thus, the front wheels 6 are steered by turning the steering wheel 1. An electric motor 7 is incorporated in the main body 4 of the power steering system for providing a torque for assisting the effort to turn the steering wheel 1.

The main body 4 of the electric power steering system is further incorporated with a power unit 8 including power FETs or other current controlling devices for controlling the electric current supplied to the electric motor 7. The electric current is supplied by a battery 9, and a pair of starter motor power cables 10 leading out of the battery 9 are connected to terminals 12a (FIG. 3) of a starter motor 12, and the starter motor terminals are in turn connected to the power unit 8 by motor drive power cables 13. It should be noted that one of the starter motor cables 10 may be omitted, and the vehicle body itself may be used as one of the cables. The same is true with the motor drive power cables 13.

Figure 3:
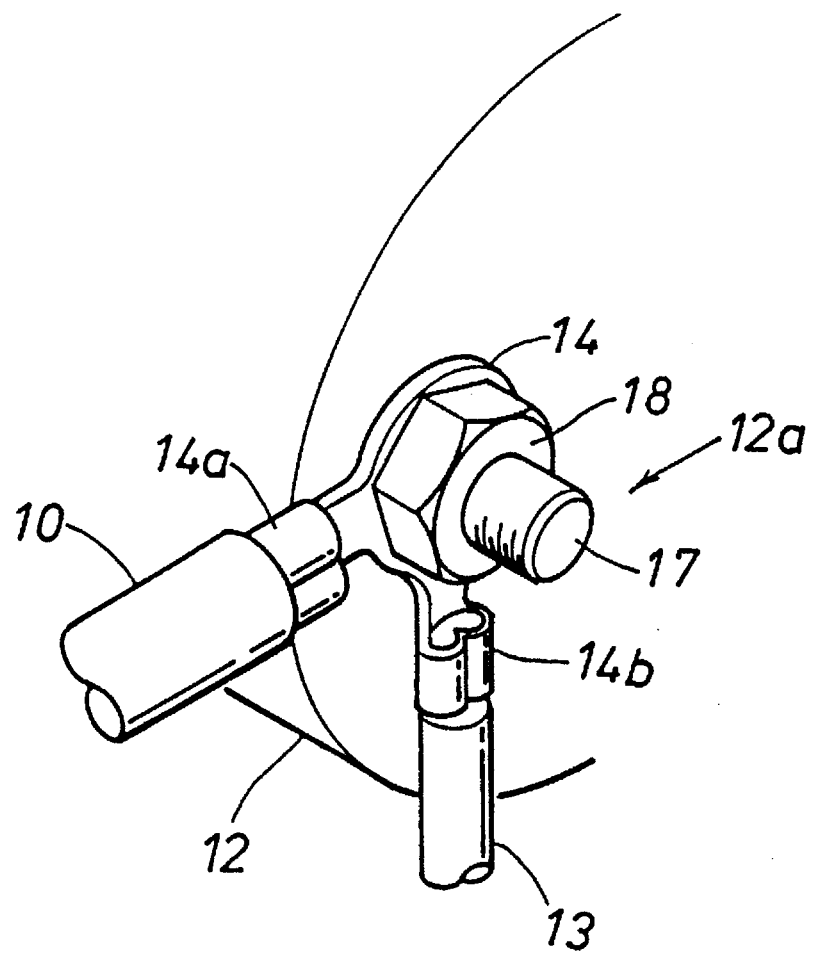
FIG. 3 is an enlarged fragmentary perspective view of a terminal for the starter motor.

FIG. 3 shows one of the starter motor terminals 12a. The starter motor terminal 12a comprises a stud bolt 17, a crimped terminal piece 14 fitted on the stud bolt 17 and a nut 18 threaded with the stud bolt 17 and securing the crimped terminal piece 14. The crimped terminal piece 14 comprises an annular portion which is fitted on the stud bolt 17, and a pair of extensions 14a and 14b extending radially from the annular portion and connected to the staffer motor cable 10 and the motor drive cable 13, respectively, by crimping. The larger extension 14a is crimped onto the larger starter motor cable 10 (40 mm$^2$ in cross sectional area, for instance), and the smaller extension 14b is crimped onto the smaller motor drive power cable 13 (8 mm$^2$ in cross sectional area, for instance). Thus, the number of component parts is minimized. However, it is also possible to use two separate crimped terminal pieces, and secure them with a single nut. In this case, the starter motor power cables 10 and the motor drive power cables 13 can be separately handled, and this may be convenient for the arrangement of power cables and wire harnesses on the motor vehicle.

In the embodiment illustrated in FIG. 2, a control unit 15 for controlling the motor 7 is provided in the passenger compartment separately from the power unit 8. This is advantageous because the power consumption of the control unit 15 is relatively small, and can be protected from electromagnetic interferences from the starter motor power cables 10 and the motor drive power cables 13 by being spaced from them. Control cables 16 extend between the control unit 15 and the power unit 8.

Thus, the motor drive power cables 13 can be made shorter as compared to the prior art. The starter motor power cables 10 are relatively large in diameter as they are intended for the starter motor, and would not cause any appreciable voltage drop for the electric power steering system. Thus, the overall voltage drop can be substantially reduced. For instance, when the motor drive power cables 10 have a cross sectional area of 8 mm$^2$, the overall voltage drop across the power cables extending from the battery to the electric power steering system can be reduced by 90%. In particular, because the starter motor and the electric power steering system are not activated at the same time, the starter motor power cables can serve the dual purpose without any ill effect.

Figure 4:
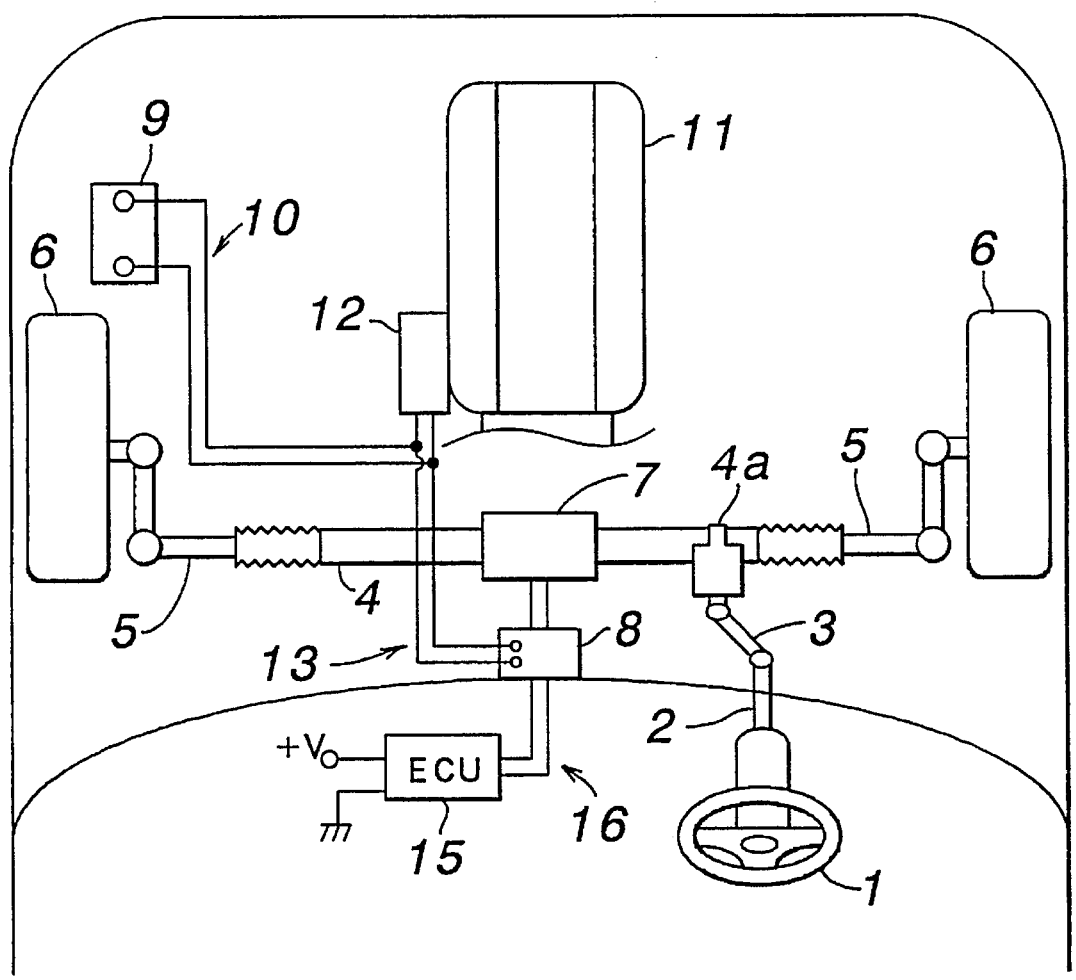
FIG. 4 is a view similar to FIG. 2 showing a second embodiment of the wiring structure for an electric power steering system according to the present invention.

FIG. 4 shows a second embodiment of the present invention. The power unit 8 is mounted inside the engine room on the bulkhead between the engine room and the passenger compartment. Even in this case, the necessary increase in the length of the power cables is more than offset by the decrease in the overall voltage drop owing to the use of the starter motor power cables 10 as a part of the motor drive power cables 13. Thus, a favorable arrangement of the power unit and the control unit can be achieved, and the wire harnesses associated with the electric power steering system can be simplified.

As yet another possible arrangement, the control unit 15 and the power unit 8 may be combined into a single unit, and this eliminates the need for the control lines, and a substantial reduction in the amount of wire harnesses can be achieved.

Figure 5:
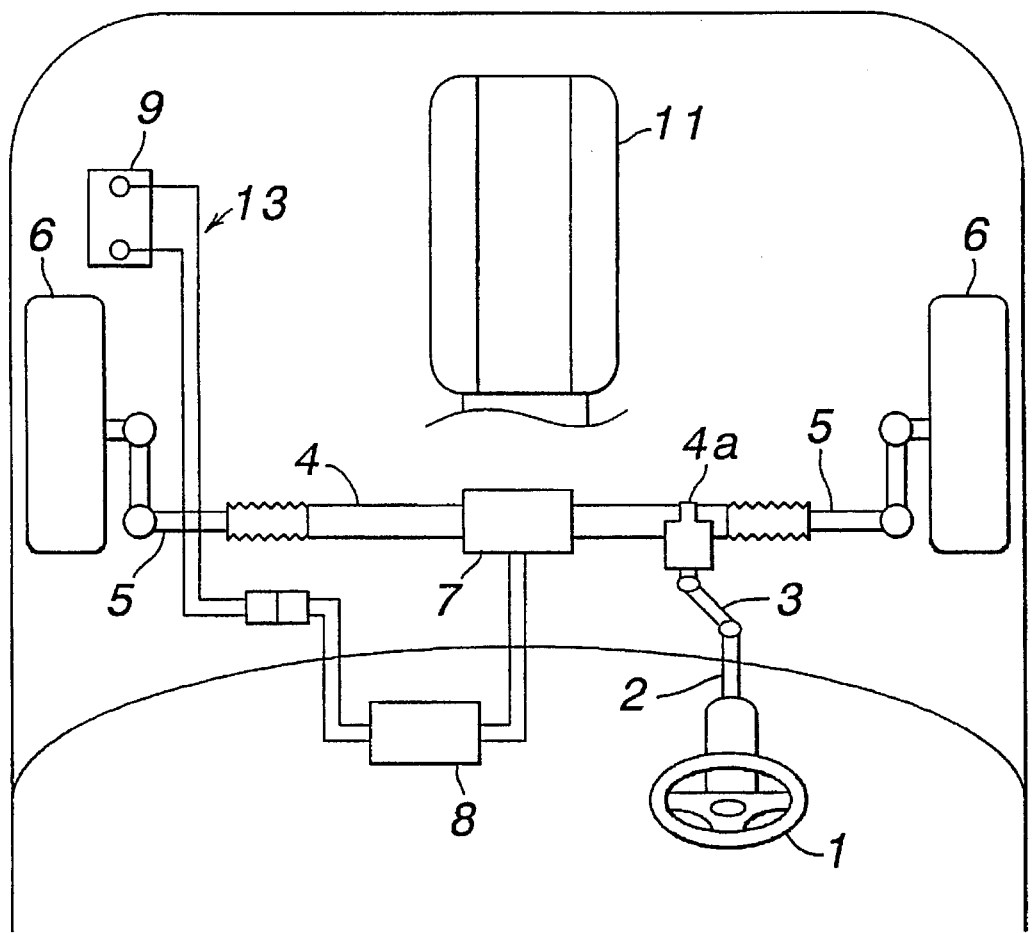
FIG. 5 is a view similar to FIG. 2 showing the conventional wiring structure for an electric power steering system.

FIG. 5 shows the prior art wiring arrangement. The motor drive power cables 13 are directly connected between the battery 9 and the power unit 8 of the electric power steering system.

Thus according to the present invention, the starter motor power cables for the starter motor, having a relatively large cross sectional area and therefore involving a very little voltage drop, are used as a part of the electric power steering system, and the length of the motor drive power cables can be reduced with the net result that the overall voltage drop can be reduced, and a sufficient power output can be produced from the electric power steering system. Also, the reduction in the length of the motor drive power cables reduces the possibility of producing electromagnetic interferences.

Although the present invention has been described in terms of preferred embodiments thereof, it is obvious to a person skilled in the art that various alterations and modifications are possible without departing from the scope of the present invention which is set forth in the appended claims.

What we claim is:

1. A wiring structure for an electric power steering system of a motor vehicle, comprising:

a starter motor power cable connected between a battery and a terminal of a starter motor for supplying electric current to said starter motor; and a motor drive power cable connected between said starter motor terminal and an electric power steering system.

2. A wiring structure for an electric power steering system according to claim 1, wherein said electric power steering system comprises a power unit provided separately from a main body of said electric power steering system.

3. A wiring structure for an electric power steering system according to claim 1, wherein said electric power steering system comprises a control unit provided separately from a main body of said electric power steering system.

4. A wiring structure for an electric power steering system according to claim 1, wherein said starter motor terminal comprises a threaded stud, a terminal piece having an annular portion fitted on said threaded stud, and a nut threadably engaged with said stud and securing said terminal piece, said terminal piece including a pair of radial extensions extending from said annular portion, and said starter motor power cable and said motor drive cable being attached to said radial extensions, respectively.

* * * * *